United States Patent
Shellhouse et al.

(10) Patent No.: US 11,582,923 B2
(45) Date of Patent: Feb. 21, 2023

(54) TRACTOR ATTACHMENT FOR STUMP GRINDING

(71) Applicants: Verne Shellhouse, Tiffin, OH (US); Devon Joseph Gillig, Tiffin, OH (US); Vernon Dave Morter, Tiffin, OH (US)

(72) Inventors: Verne Shellhouse, Tiffin, OH (US); Devon Joseph Gillig, Tiffin, OH (US); Vernon Dave Morter, Tiffin, OH (US)

(73) Assignee: DV2 LLC, Tiffin, OH (US)

( * ) Notice: Subject to any disclaimer, the term of this patent is extended or adjusted under 35 U.S.C. 154(b) by 265 days.

(21) Appl. No.: 17/110,866

(22) Filed: Dec. 3, 2020

(65) Prior Publication Data

US 2021/0169019 A1 Jun. 10, 2021

Related U.S. Application Data (60) Provisional application No. 62/943,299, filed on Dec. 4, 2019.

(51) Int. Cl.
*A01G 23/06* (2006.01)
*B02C 23/04* (2006.01)
*B62D 49/06* (2006.01)

(52) U.S. Cl.
CPC ........... *A01G 23/067* (2013.01); *B02C 23/04* (2013.01); *B62D 49/065* (2013.01); *B02C 2201/066* (2013.01)

(58) Field of Classification Search
CPC ............................. A01G 23/06; A01G 23/067
See application file for complete search history.

(56) References Cited

U.S. PATENT DOCUMENTS

| | | | | |
|---|---|---|---|---|
| 3,389,726 A | * | 6/1968 | Good | A01G 23/067 144/218 |
| 5,718,271 A | * | 2/1998 | Engelhoven | A01G 23/067 60/431 |
| 2004/0244869 A1 | * | 12/2004 | Schafer | A01G 23/093 144/34.1 |
| 2006/0156704 A1 | * | 7/2006 | Everett | A01G 3/002 56/15.2 |
| 2017/0347541 A1 | * | 12/2017 | Casper | A01G 23/067 |
| 2019/0350143 A1 | | 11/2019 | Knipp et al. | |

* cited by examiner

*Primary Examiner* — Adam J Eiseman
*Assistant Examiner* — Bobby Yeonjin Kim
(74) *Attorney, Agent, or Firm* — Jacob M. Ward; Ward Law Office LLC (57) ABSTRACT

A tractor attachment for stump grinding has an attachment body, which has at least a shield opening, a hydraulic motor opening, and a pulley opening that are disposed through the tractor attachment. An attachment arm is coupled to the tractor attachment. A shield is removably mounted over a portion of the shield opening. A grinder with a grinder blade and a grinder pulley are mounted on an underside of the attachment body. A hydraulic motor with a hydraulic motor pulley is mounted through the hydraulic motor opening. At least one belt is rotatably disposed between the hydraulic motor pulley and the grinder pulley. The attachment arm is configured to be attached to a boom attachment on a tractor boom.

16 Claims, 7 Drawing Sheets

TRACTOR ATTACHMENT FOR STUMP GRINDING

CROSS REFERENCE TO RELATED APPLICATIONS

This application claims the benefit of U.S. Provisional Application Ser. No. 62/943,299, filed on Dec. 4, 2019. The entire disclosure of the above application is incorporated herein by reference.

FIELD

The disclosure generally relates to stump grinding, and more particularly, to an attachment for stump grinding.

INTRODUCTION

This section provides background information related to the present disclosure which is not necessarily prior art.

Stump grinders include devices that employ a frame that carries a rotatable grinding wheel at an outer end. The grinding wheel extends vertically and has powered rotation about a substantially horizontal axis of rotation. When the grinding wheel is placed into operation and is rotating in a vertical plane about its substantially horizontal axis of rotation, the operator can pivot the grinding arm up and down and from side-to-side. This causes the grinding wheel to bite into and traverse over the stump or other wood debris that is to be grinded into particles. As repeated passes of the grinding arm and grinding wheel are made relative to the stump or other wood debris, the action of the grinding wheel gradually reduces the stump or wood debris to small wood chips or fine particles.

Conventional stump grinders may include large apparatuses that are disposed at a fixed distance behind a tractor. The tractor must be able to be driven near the stump or other wood debris in order for the large attached apparatus to be utilized. These conventional stump grinders are limited to where the tractor may drive to. The areas for stump grinding may include clearing land adjacent to roads and along utility lines. The land adjacent to roads and along utility lines often have embankments and other uneven surfaces. This terrain makes it impractical for tractors to drive upon in order for the conventional stump grinders to reach a desired area. Another limitation of the conventional stump grinders are the high costs of the large apparatuses. More material is required to manufacture the conventional stump grinders and that cost is then transferred onto the consumer.

There is a continuing need for a tractor attachment for stump grinding that may extend from the tractor and reach across uneven terrain. Desirably, the tractor attachment for stump grinding may be manufactured with less materials than conventional stump grinders, thereby decreasing the overall cost.

SUMMARY

In concordance with the instant disclosure, a tractor attachment for stump grinding that may extend from the tractor and reach across uneven terrain, which may be manufactured with less materials than conventional stump grinders, thereby decreasing the overall cost, has surprisingly been discovered.

Tractor attachments for stump grinding are provided that include an attachment body having a shield opening, a hydraulic motor opening, a pulley opening, and an attachment arm. The attachment body may have a shield mounted over a portion of the shield opening. The attachment body may also have a grinder with a grinder blade mounted on an underside of the attachment body. The attachment body may further have a hydraulic motor mounted through the hydraulic motor opening. At least one belt may be rotatably disposed between the hydraulic motor and the grinder.

Ways of using tractor attachments for stump grinding are also provided. These include methods where a tractor attachment is provided having an attachment body. The attachment body may have a shield opening, a hydraulic motor opening, a pulley opening, and an attachment arm. The attachment body may have a shield mounted over a portion of the shield opening. The attachment body may also have a grinder with a grinder blade mounted on an underside of the attachment body. The attachment body may further have a hydraulic motor mounted through the hydraulic motor opening. At least one belt may be rotatably disposed between the hydraulic motor and the grinder. The method may also include a step of grinding a desired area using the tractor attachment. In an exemplary embodiment, the tractor attachment is configured to allow road maintenance personnel to remotely grind stumps to ground level and below in an expeditious manner, where the stumps may be located twenty-two feet or more away from a road, on a hillside, and/or in difficult terrain.

The tractor attachment for stump grinding may have an attachment body. The attachment body may have a main plate and at least one secondary plate. The main plate and the secondary plate may be formed generally perpendicular to each other. The main plate may have a shield opening and a pulley opening formed therein. A shield may be mounted on a top surface of the main plate over a portion of the shield opening. A grinder (e.g., a Blue Shark® grinder), with a grinder blade on one end and a grinder pulley on another end, may be mounted on a bottom surface of the main plate. The grinder blade may extend into a portion of the shield opening beneath the shield, with another portion of the shield opening being where the stump chips are to be expelled. The grinder pulley may extend below the pulley opening.

The secondary plate may have an attachment arm disposed thereon. The attachment arm may be configured to be mounted on a tractor boom arm at an outward end of a tractor boom that would be in mechanical communication with the attachment arm. The secondary plate may also have a hydraulic motor opening formed therein, where a hydraulic motor, with a hydraulic motor pulley mounted thereon. The hydraulic motor pulley may be disposed through the hydraulic motor opening. At least one hydraulic motor pulley belt may be rotatably disposed between the hydraulic motor pulley and the grinder pulley. Two hydraulic motor pulley belts may be preferred. With two hydraulic motor pulley belts employed, the stump grinding operation may continue even where one belt breaks. Where one belt breaks, the second belt would continue to drive the hydraulic motor. In having an added belt, damage to the grinder blade or anything near an area where the tractor attachment is being used, would not be exposed to undesired effects. A hydraulic motor may be located on a tractor. The hydraulic motor may be in hydraulic fluid communication with the attachment body, by way of hydraulic hoses that are connected therebetween. It should also be appreciated that the attachment arm may instead be attached adjacent the bottom surface of the main plate so as to provide for better control with the boom and shorter strokes in operation.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As shown in FIGS. 1-7, a tractor attachment 100 for stump grinding has an attachment body 102 having a shield opening 104, a hydraulic motor opening 106, a pulley opening 108, and an attachment arm 110. The attachment body 102 may have a shield 112 mounted over a portion of the shield opening 104. The attachment body 102 may also have a grinder 114 with a grinder blade 116 mounted on an underside 118 of the attachment body 102. The attachment body 102 may further have a hydraulic motor 120 mounted through the hydraulic motor opening 106. At least one belt 122, 123 may be rotatably disposed between the hydraulic motor 120 and the grinder 114.

In one example, the shield 112 may removably attached over a portion of the shield opening 104. The shield 112 may be removably attached over a portion of the shield opening 104 through the use of fasteners 124. Advantageously, the removably attached shield 112 may allow for easier cleaning, maintenance, and repairs of the attachment body 102 and grinder blade 116. One skilled in the art may select other suitable methods of attaching the shield 112 to the attachment body 102, within the scope of the present disclosure.

Figure 1:
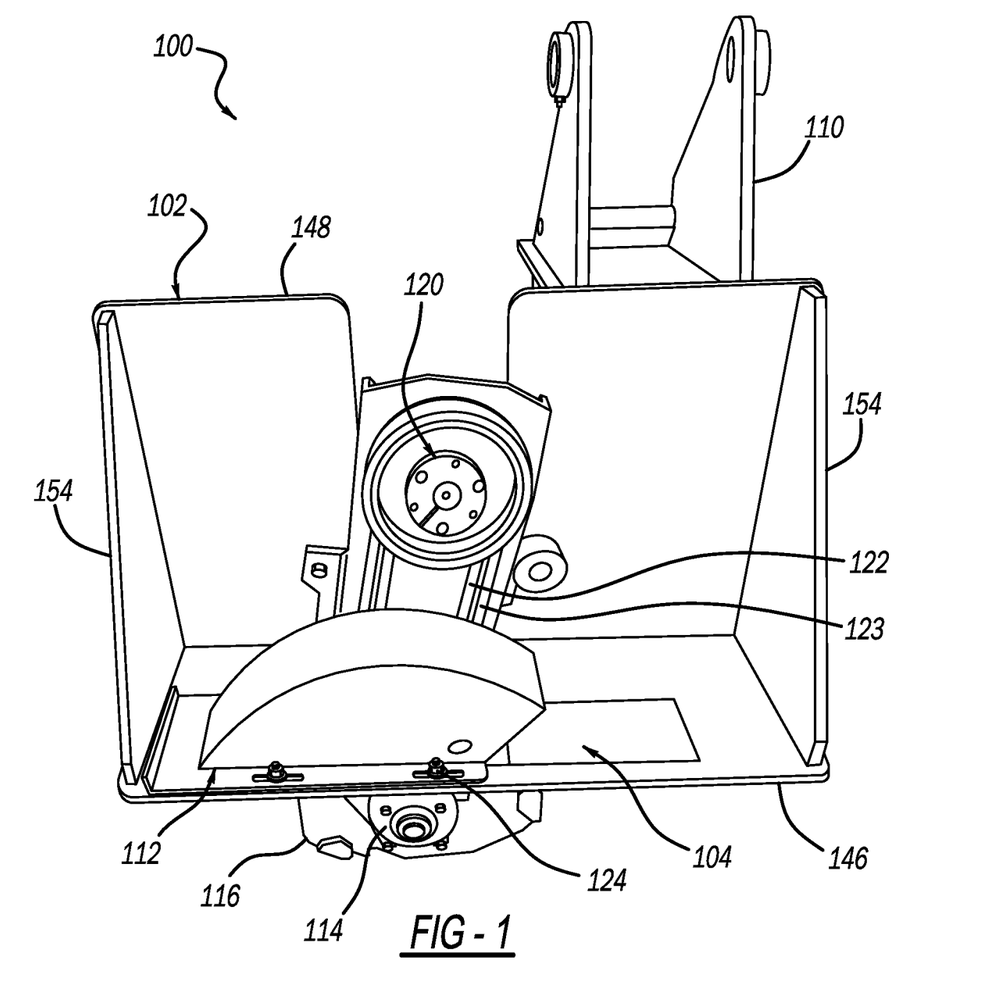
FIG. 1 is a front perspective view of a tractor attachment for stump grinding, according to one embodiment of the present technology.
Figures 2, 3:
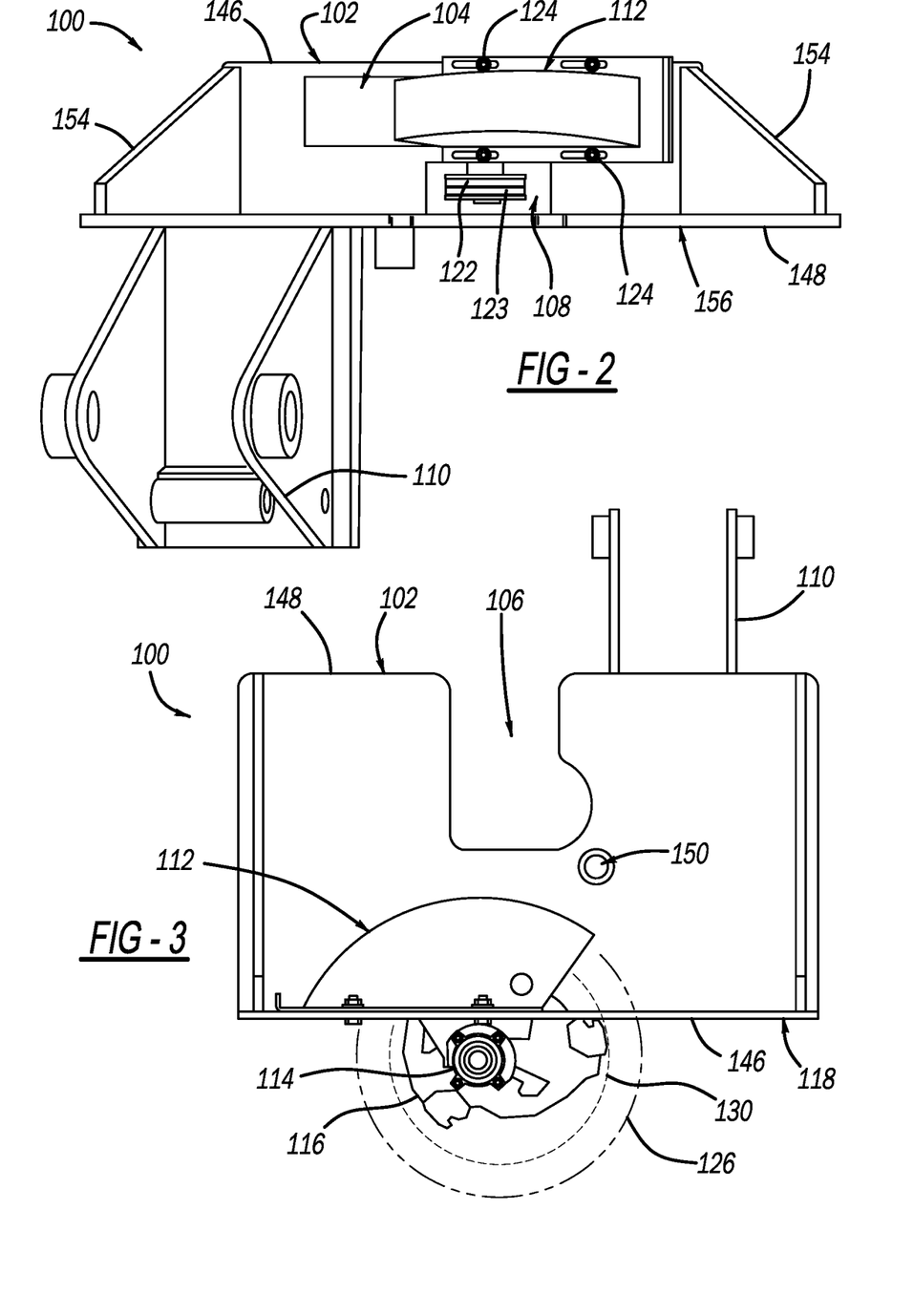
FIG. 2 is a top plan view of the tractor attachment, as shown in FIG. 1, depicted without a mower motor, according to one embodiment of the present disclosure.
FIG. 3 is a front perspective view of the tractor attachment, as shown in FIGS. 1-2, depicted without a mower motor, according to one embodiment of the present disclosure.
Figure 4:
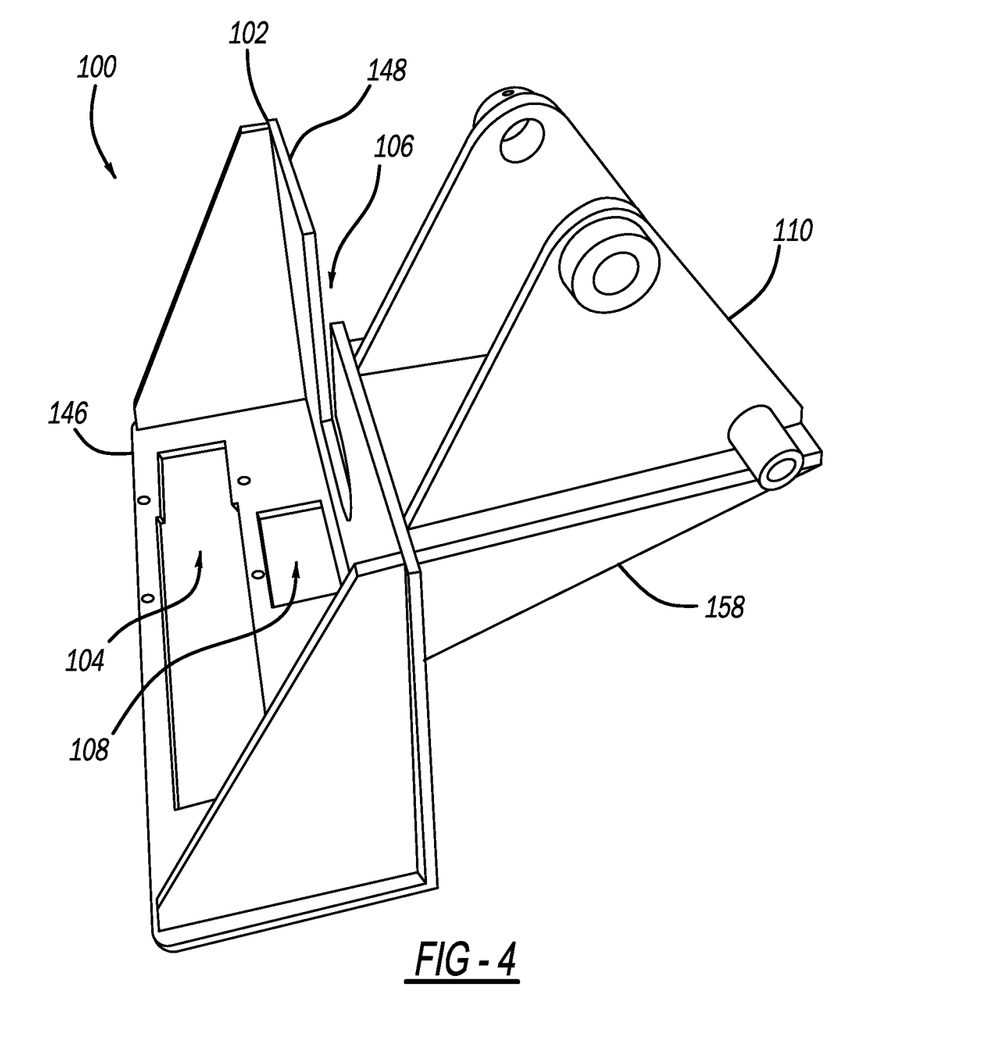
FIG. 4 is a top perspective view of the tractor attachment, as shown in FIGS. 1-3, depicted without the mower motor, a blade, and a pulley, according to one embodiment of the present disclosure.
Figure 7:
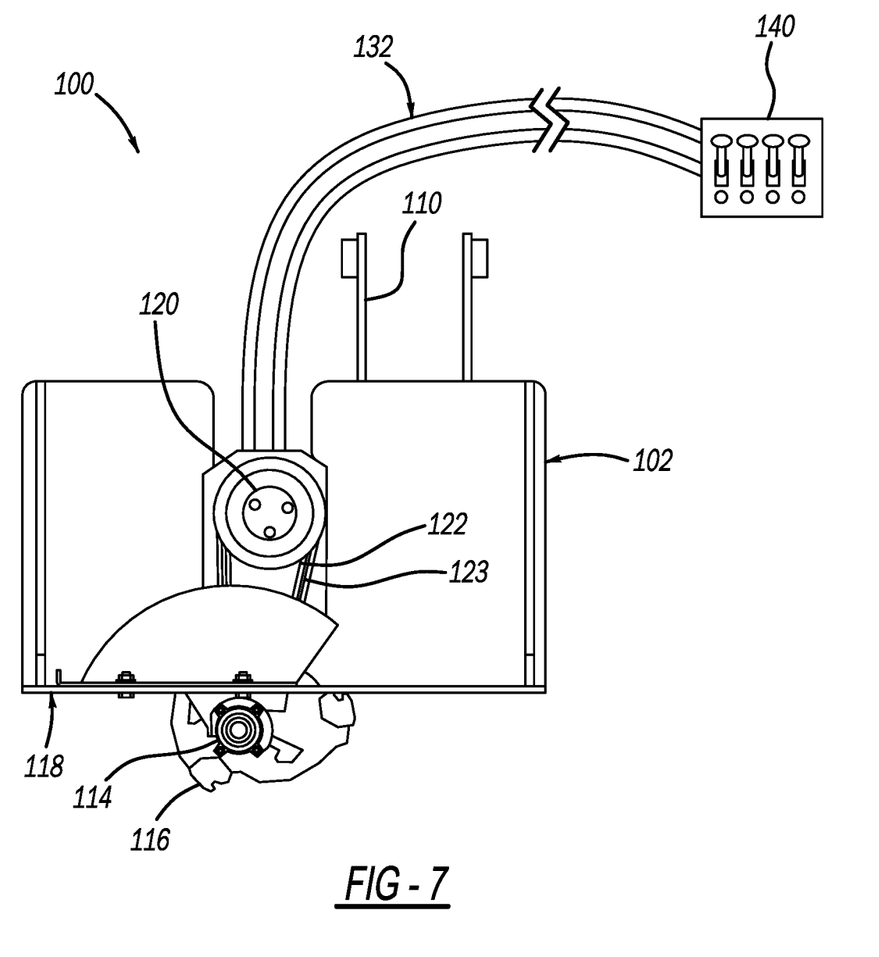
FIG. 7 is a schematic view of the tractor attachment coupled to a control panel, according to one embodiment of the present disclosure.

As shown in FIGS. 1, 3, and 7, the shield 112 may have a first circumference 126 which may be configured to militate against grinding debris (not shown) clogging the shield 112. In a more specific example, the perimeter of the grinder blade 116 may have a second circumference 130. The first circumference 126 may be larger than the second circumference 130. Without being bound to any particular theory, it is believed the larger first circumference 126 of the shield 112 may militate against grinding debris (not shown) clogging the shield 112. The first circumference 126 may be further defined as the shield 112 have a larger curvature than a radius of the second circumference 130. A skilled artisan may select other shield 112 designs to militate against grinding debris clogging the shield 112, within the scope of the present disclosure.

In another example, two belts 122, 123 may be rotatably disposed between the hydraulic motor 120 and the grinder 114. With two hydraulic motor pulley belts 122, 123 employed, a stump grinding operation may continue even in a particular situation where a first belt 122 breaks. Advantageously, where the first belt 122 breaks, the second belt 123 would continue to drive the hydraulic motor 120, permitting the stump grinding operation to continue. Desirably, the second belt 123 may militate against undesired damage or negative effects to each of the grinder blade 116, the attachment body 102, or anything nearby where the tractor attachment 100 for stump grinding is being used. One skilled in the art may select any kind or number of belts to employ that would prevent the breakage of the belts or damage to equipment, within the scope of the present disclosure.

The at least one belt 122, 123 may also more broadly include a drive belt, a chain, a cord, and/or a means of transferring rotational force. Specifically, the at least one belt 122, 123 is preferably a drive belt to advantageously provide shock absorption. Desirably, the at least one belt 122, 123 is preferably a drive belt which is configured to slip, rather than over-exert the hydraulic motor 120, where the grinder blade 116 is bound, pinched, stuck, or otherwise incapable of rotating.

Figure 6:
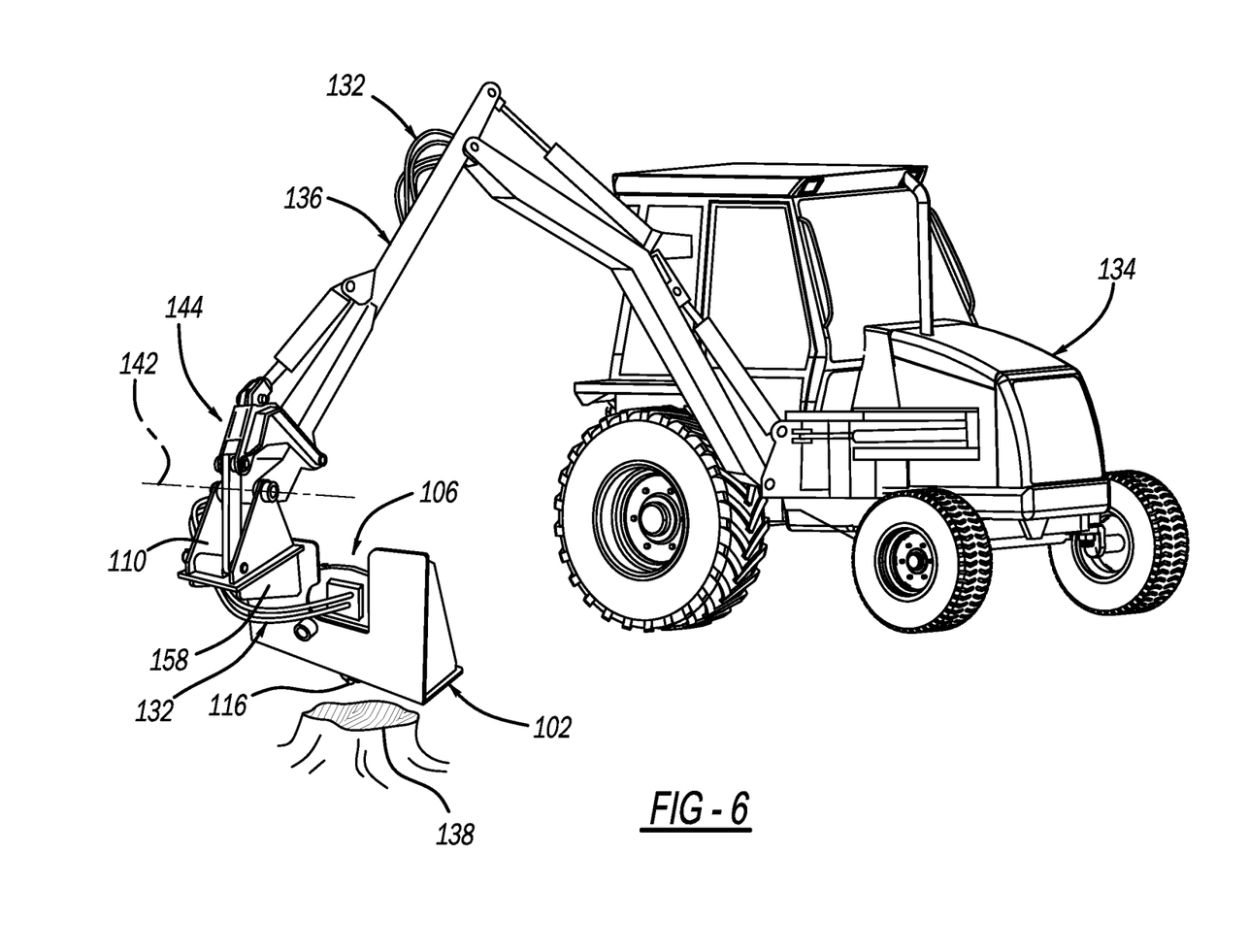
FIG. 6 is a side perspective view of the tractor attachment, depicted with the tractor attachment disposed on and extended from a tractor grinding a stump, in operation, according to one embodiment of the present disclosure.

As shown in FIGS. 6-7, the tractor attachment 100 for stump grinding may have a hydraulic coupling 132. The hydraulic coupling 132 may be in hydraulic fluid communication with the hydraulic motor 120. Advantageously, the hydraulic coupling 132 may allow for the hydraulic motor 120 to be disposed on a tractor 134, rather than directly on the tractor attachment 100 for stump grinding itself. Desirably, where the hydraulic motor 120 is disposed on the tractor 134, the tractor attachment 100 for stump grinding may be less costly to manufacture by not requiring the tractor attachment 100 for stump grinding to be supplied with an independent hydraulic motor 120.

Figure 5:
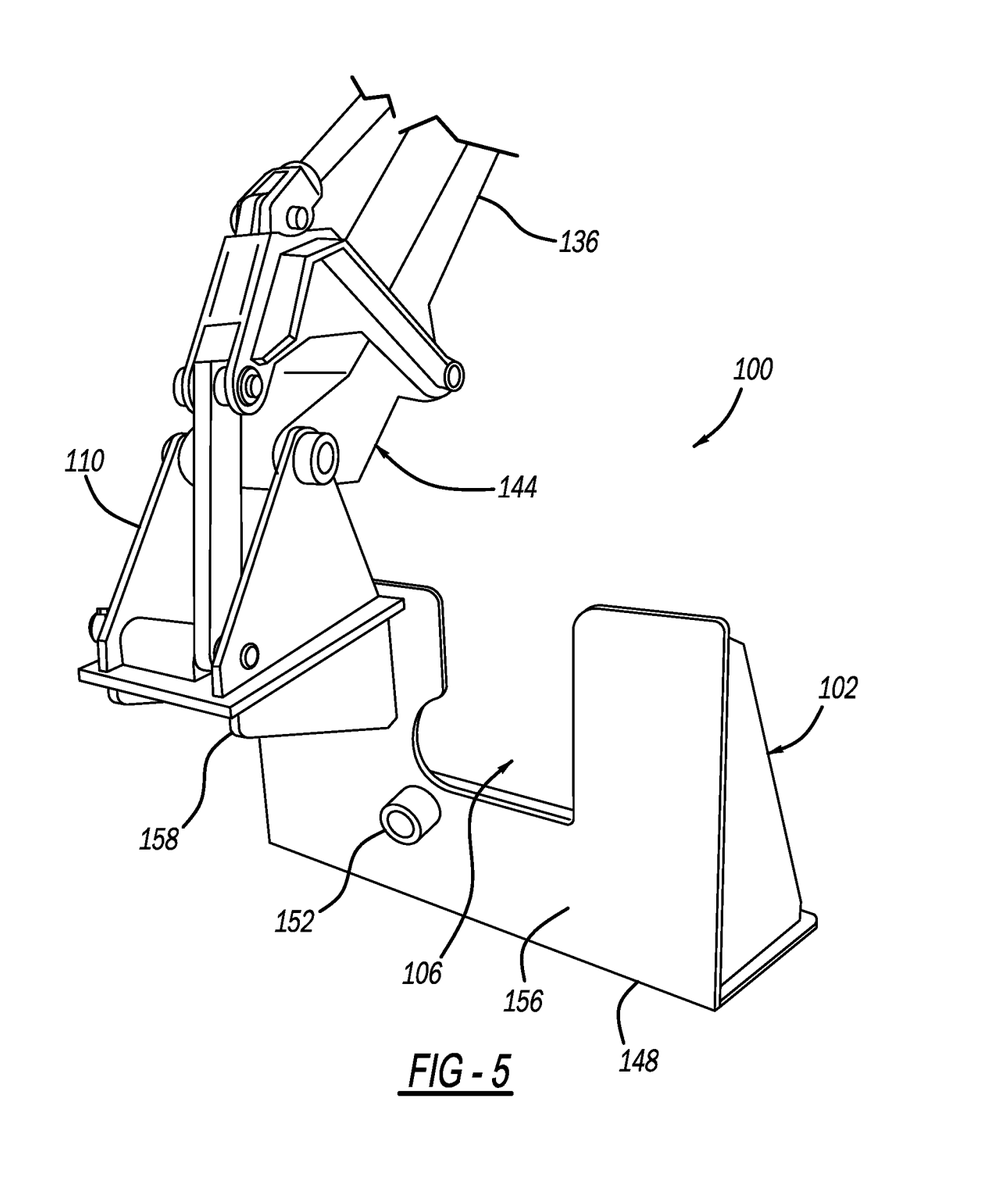
FIG. 5 is a rear perspective view of the tractor attachment, as shown in FIGS. 1-4, depicted with the tractor attachment disposed on a tractor boom, according to one embodiment of the present disclosure.

In a particular example, as shown in FIG. 6, the tractor 134 may be provided with the tractor attachment 100 for stump grinding. In a more particular example, as shown in FIGS. 5-6, the attachment arm 110 may be configured to be removably attached to a tractor boom 136. Advantageously, by removably attaching the attachment arm 110 to the tractor boom 136, the tractor boom 136 may selectively extend the tractor attachment 100 for stump grinding to twenty-two feet or more away from the tractor 134. Desirably, by selectively extending the attachment arm 110 on the tractor boom 136, a stump 138 on difficult terrain may be more easily grinded without requiring the tractor 134 to reach the stump 138 itself. A skilled artisan may select any kind of tractor 134 and tractor boom 136 to selectively extend the attachment body 102 from the tractor 134, within the scope of the present disclosure.

In another specific example, the attachment body 102 may be provided with a blade 116 configured to cut trees and other materials. Where the attachment body 102 is provided with a blade 116 to cut trees and other materials, and the attachment body 102 is further disposed on the tractor boom, the attachment body 102 may be utilized to cut upright trees (not shown).

As shown in FIG. 7, the tractor attachment 100 for stump grinding may further include a control panel 140 in electrical communication with at least one of the attachment body 102 and the hydraulic motor 120. The control panel 140 may be configured to selectively turn on and off the grinder 114. The control panel 140 may also be configured to selectively move the tractor attachment 100 for stump grinding, where the tractor attachment 100 for stump grinding is disposed on the tractor boom 136. In a specific example, the control panel 140 may be configured to selectively move the tractor attachment 100 for stump grinding upwards, downwards, forwards, rearwards, and sideways. In a more specific example, the control panel 140 may be configured to selectively rotate the tractor attachment 100 for stump grinding on an axis 142 about an end 144 of the tractor boom 136. In an even more specific example, the hydraulic coupling 132 includes valves (not shown) which direct the flow of hydraulic fluid (not shown) throughout the tractor boom 136 and the hydraulic coupling 132, to and from the hydraulic motor 120. The control panel 140 may be in electrical communication with the valves (not shown) to indirectly control the flow of the hydraulic fluid (not shown), thereby controlling the movement and activation of the tractor attachment 100 for stump grinding. In certain examples, the control panel 140 and a pressurized hydraulic fluid source and associated valves (not shown) may be provided by the tractor 134 and disposed on the tractor 134, where the pressurized hydraulic fluid source may be coupled to the hydraulic coupling 132 of the attachment 100. A skilled artisan may select other desirable features to be included on the control panel 140, within the scope of the present disclosure.

As shown in FIGS. 1-7, the attachment body 102 may have a main plate 146 and a secondary plate 148. The main plate 146 may be attached substantially perpendicular to the secondary plate 148. The shield opening 104 may be disposed on the main plate 146 and the pulley opening 108 may also be disposed on the main plate 146. The hydraulic motor opening 106 may be disposed on the secondary plate 148. In a specific example, the secondary plate 148 may have an aperture 150 configured to permit the attachment of the hydraulic motor 120 to the secondary plate 148. The secondary plate 148 may also include an annular ring 152 disposed over the aperture 150. The annular ring 152 may be configured to further support the attachment of the hydraulic motor 120 to the attachment body 102.

With continued reference to FIGS. 1-7, at least one support plate 154 may be disposed between the main plate 146 and the secondary plate 148. The secondary plate 148 may have a side surface 156 and the attachment arm 110 may be further disposed on the side surface 156. The attachment body 102 may further include a brace 158 disposed between the side surface 156 of the secondary plate 148 and the attachment arm 110. Advantageously, each of the at least one support plate 154 and the brace 158 may enhance the structural integrity and the durability of the attachment body 102. One skilled in the art may select other ways to enhance the structural integrity and the durability of the attachment body 102, within the scope of the present disclosure.

In one example, the attachment body 102 may be constructed from materials with a necessary strength configured to militate against damage to the attachment body 102 during operation. In a more specific example, a material with the necessary strength configured to militate against damage to the attachment body 102 during operation may be steel with a thickness at or greater than ½ inches. In an even more specific example, the attachment body 102 may be constructed from steel with a thickness substantially around % inches. Advantageously, by constructing the attachment body 102 with steel that has a thickness at or greater than 1/2 inches, the attachment body 102 may have greater structural integrity and durability.

In another example, the tractor attachment 100 for stump grinding has a kill switch (not shown). The kill switch (not shown) permits a user to selectively turn on and turn off electrical power to the hydraulic motor 120. Advantageously, the kill switch (not shown) allows a user to adjust the at least one belt 122, 123 on a selectively non-operative tractor attachment 100 for stump grinding. The kill switch (not show) may be included in the control panel 140.

Figure 8:
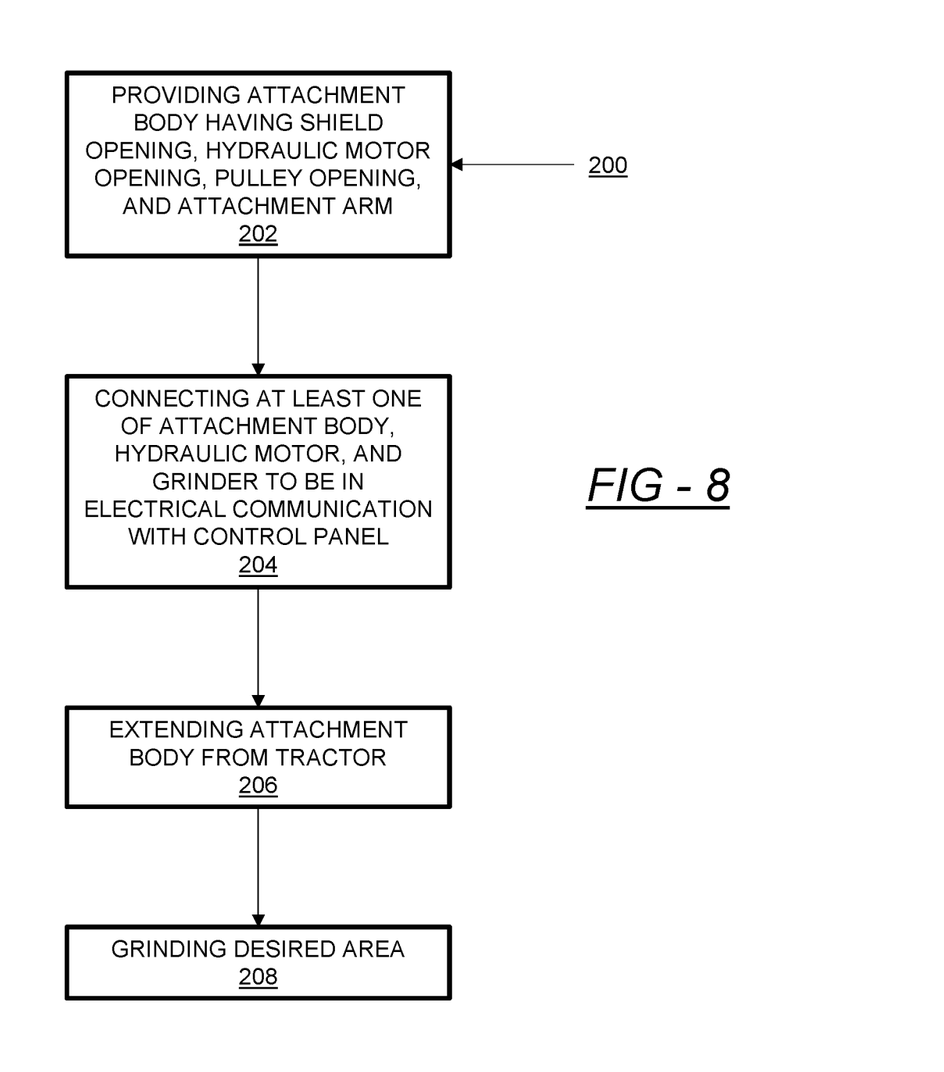
FIG. 8 is a flowchart of a method for using the tractor attachment for stump grinding, shown in FIGS. 1-7, according to one embodiment of the present disclosure.

In particular embodiments, including the example shown in FIG. 8, a method 200 of using the tractor attachment 100 is provided. The method 200 may include a step 202 of providing an attachment body 102. The attachment body 102 may have a shield opening 104, a hydraulic motor opening 106, a pulley opening 108, and an attachment arm 110. The attachment body 102 may have a shield 112 mounted over a portion of the shield opening 104. The attachment body 102 may also have a grinder 114 with a grinder blade 116 mounted on an underside 118 of the attachment body 102. The attachment body 102 may further have a hydraulic motor 120 mounted through the hydraulic motor opening 106. At least one belt 122, 123 may be rotatably disposed between the hydraulic motor 120 and the grinder 114.

The method 200 may include a step 204 of connecting at least one of the attachment body 102, the hydraulic motor 120, and the grinder 114 to be in electrical communication with a control panel 140. In some circumstances, the method 200 also includes a step 206 of extending the attachment body 102 from the tractor 134. The method 200 may also include a step 208 of grinding a desired area.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A tractor attachment for stump grinding, comprising:
   an attachment body having a shield opening, a hydraulic motor opening, a pulley opening, and an attachment arm;
   a shield mounted over a portion of the shield opening;
   a grinder with a grinder blade mounted on an underside of the attachment body;
   a hydraulic motor mounted through the hydraulic motor opening; and
   at least one belt rotatably disposed between the hydraulic motor and the grinder,
   wherein the attachment arm is configured to be directly removably attached to a tractor boom,
   wherein the attachment body includes a main plate and a secondary plate, the main plate attached substantially perpendicular to the secondary plate,
   wherein the shield opening is disposed on the main plate and the pulley opening is disposed on the main plate, and
   wherein the secondary plate includes a side surface and the attachment arm is disposed on the side surface.

2. The tractor attachment for stump grinding of claim 1, wherein the shield is removably attached over a portion of the shield opening.

3. The tractor attachment for stump grinding of claim 1, wherein the shield has a curvature which is configured to militate against grinding debris clogging the shield.

4. The tractor attachment for stump grinding of claim 1, wherein two belts are rotatably disposed between the hydraulic motor and the grinder.

5. The tractor attachment for stump grinding of claim 1, further comprising a hydraulic coupling, the hydraulic coupling configured to provide hydraulic fluid communication with the hydraulic motor.

6. The tractor attachment for stump grinding of claim 1, further comprising a control panel in electrical communication with at least one of the attachment body and the hydraulic motor.

7. The tractor attachment for stump grinding of claim 1, wherein the hydraulic motor opening is disposed on the secondary plate.

8. The tractor attachment for stump grinding of claim 1, wherein at least one support plate is disposed between the main plate and the secondary plate.

9. The tractor attachment for stump grinding of claim 1, further comprising a brace disposed between the side surface of the secondary plate and the attachment arm.

10. The tractor attachment for stump grinding of claim 1, wherein the secondary plate includes an aperture configured to attach the hydraulic motor to the secondary plate.

11. The tractor attachment for stump grinding of claim 10, further comprising an annular ring disposed over the aperture on the side surface, the annular ring configured to further support the attachment of the hydraulic motor.

12. A tractor comprising the tractor attachment for stump grinding of claim 1.

13. A tractor attachment for stump grinding, comprising:
an attachment body having a shield opening, a hydraulic motor opening, and a pulley opening, and an attachment arm;
a hydraulic coupling, the hydraulic coupling in hydraulic fluid communication with the hydraulic motor;
an annular ring disposed over an aperture on a side surface on the attachment body, the annular ring configured to further support the attachment of the hydraulic motor; and
wherein a shield is mounted over a portion of the shield opening, a grinder with a grinder blade is mounted on an underside of the attachment body, the hydraulic motor is mounted through the hydraulic motor opening, at least one belt is rotatably disposed between the hydraulic motor and the grinder, the shield is removably attached over a portion of the shield opening, the shield having a curvature which is configured to militate against grinding debris clogging the shield, wherein two belts are rotatably disposed between the hydraulic motor and the grinder, the attachment arm is directly removably attached to a tractor boom, the attachment body having a main plate and a secondary plate, the main plate is attached substantially perpendicular to the secondary plate, each of the shield opening and the pulley opening are disposed on the main plate, the hydraulic motor opening is disposed on the secondary plate, at least one support plate is disposed between the main plate and the secondary plate, the secondary plate having a side surface, the attachment arm is disposed on the side surface, a brace disposed between the side surface of the secondary plate and the attachment arm, the at least one aperture is disposed on the secondary plate, the at least one aperture is configured to attach the hydraulic motor to the secondary plate.

14. A method of using a tractor attachment for grinding a desired area, the method comprising the steps of:
providing a tractor attachment including: an attachment body having a shield opening, a hydraulic motor opening, a pulley opening, an attachment arm; a shield mounted over a portion of the shield opening; a grinder with a grinder blade mounted on an underside of the attachment body; a hydraulic motor mounted through the hydraulic motor opening; and at least one belt rotatably disposed between the hydraulic motor and the grinder,
wherein the attachment arm is configured to be directly removably attached to a tractor boom,
wherein the attachment body includes a main plate and a secondary plate, the main plate attached substantially perpendicular to the secondary plate,
wherein the shield opening is disposed on the main plate and the pulley opening is disposed on the main plate, and
wherein the secondary plate includes a side surface and the attachment arm is disposed on the side surface; and
grinding the desired area using the tractor attachment.

15. The method of claim 14, wherein the method also includes a step of connecting at least one of the attachment body, the hydraulic motor, and the grinder to be in electrical communication with a control panel.

16. The method of claim 14, wherein the method also includes a step of extending the tractor attachment using the tractor boom from a tractor before the step of grinding a desired area.

* * * * *